United States Patent [19]

Schiel

[11] Patent Number: 6,159,880
[45] Date of Patent: Dec. 12, 2000

[54] PAPER MACHINE FELT WITH ENHANCED TWO-SIDED STRUCTURE

[76] Inventor: Christian Schiel, Kandinsky Weg 8, D-82418 Murnau, Germany

[21] Appl. No.: 09/097,581

[22] Filed: Jun. 15, 1998

[30] Foreign Application Priority Data

| Jun. 30, 1997 | [DE] | Germany | 197 27 521 |
| Jun. 30, 1997 | [DE] | Germany | 297 11 279 U |
| May 5, 1998 | [DE] | Germany | 198 19 641 |

[51] Int. Cl.$^7$ ................................................. B32B 5/06
[52] U.S. Cl. ...................... 442/270; 442/388; 162/358.2; 162/900; 28/107; 28/112; 28/117
[58] Field of Search .............................. 28/107, 112, 117; 442/270, 388; 162/358.2, 900

[56] References Cited

U.S. PATENT DOCUMENTS 4,259,394  3/1981  Khan ........................................ 428/229
4,565,735  1/1986  Murka, Jr. et al. ..................... 428/234

FOREIGN PATENT DOCUMENTS 17 85 549  8/1972  Germany ........................ B65H 39/16

OTHER PUBLICATIONS (APR) "Aligemeine Papier–Rundschau", No. 37/38, 1970, pp. 1378–1388.

*Primary Examiner*—Christopher Raimund
*Attorney, Agent, or Firm*—Ice Miller; James D. Wood; Doreen J. Gridlev

[57] ABSTRACT

A felt provides a uniform paper-supporting surface having good water storage and water release properties. These qualities are effected by a bat including one or more layers of fine fibers being needled onto a base containing perforations and cavities. The free surfaces of the bat fibers needled into the cavities are reduced in a special production step following the needling operation.

14 Claims, 3 Drawing Sheets

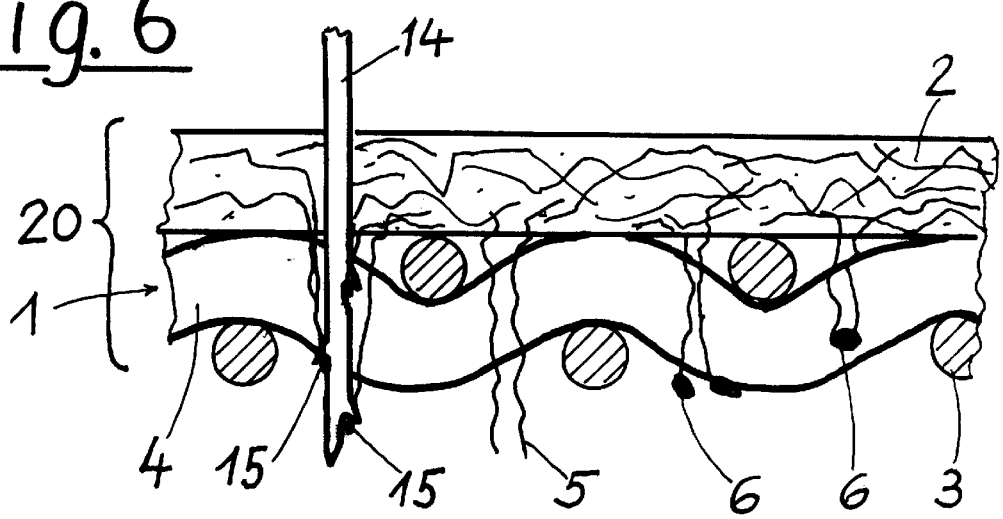
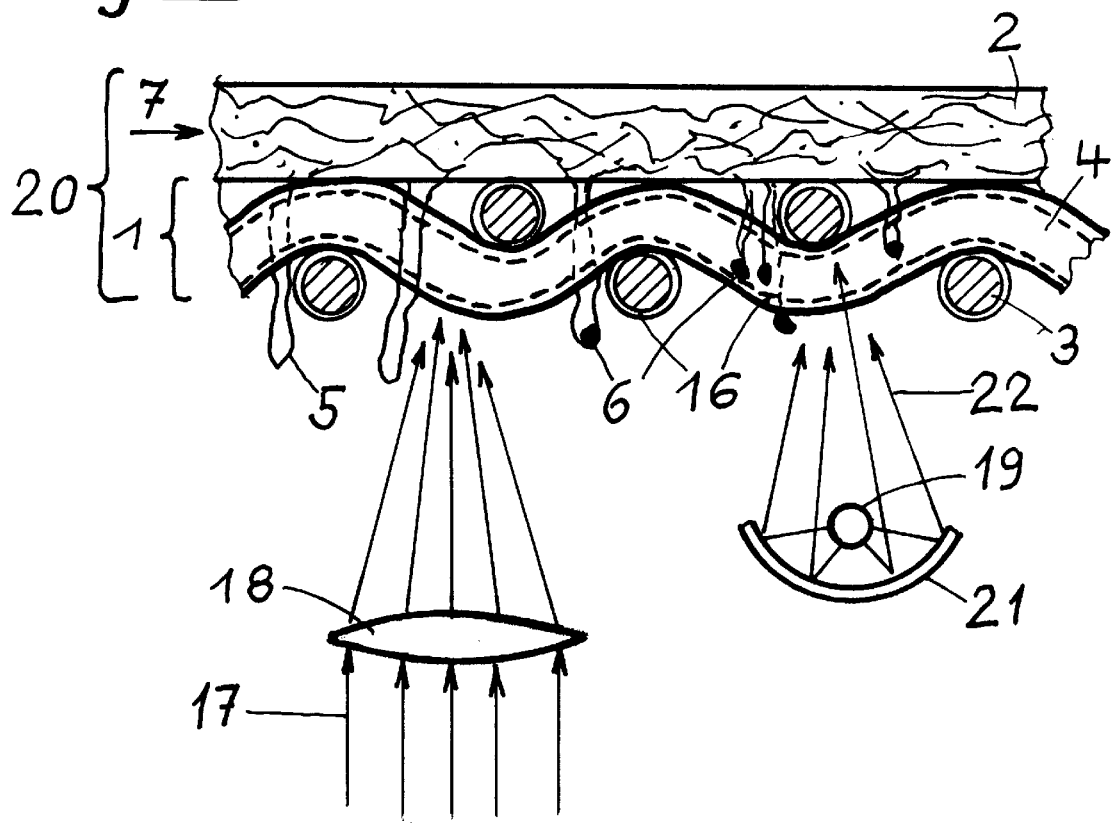

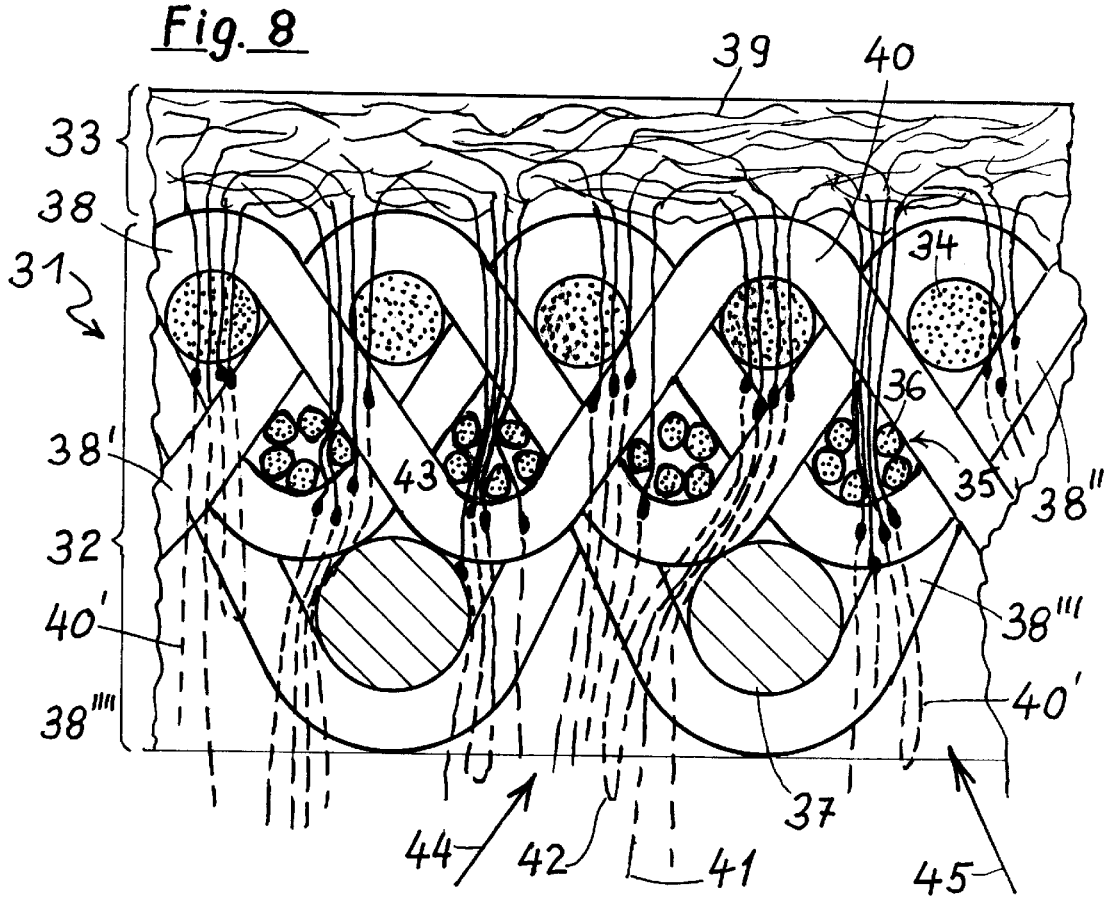
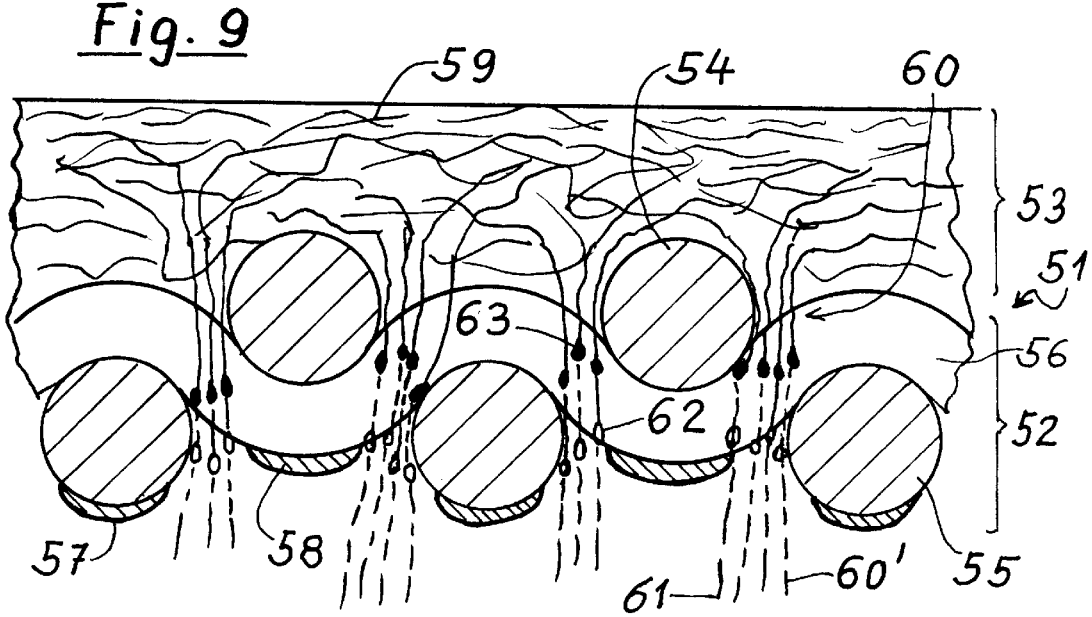

PAPER MACHINE FELT WITH ENHANCED TWO-SIDED STRUCTURE

BACKGROUND OF THE INVENTION

1. Field of the Invention

The present invention relates to a paper machine felt for the support and dewatering of running paper webs in paper machines as well as a method of manufacture for paper machine felts. Such felts include a lower carrier layer, also known as a base, and an upper layer of fibers, also known as a bat.

2. Description of the Related Art

The function of the carrier layer is to impart tensile strength to the felt in machine direction as well as in cross machine direction. The function of the bat layer is to support the paper web. In addition, both layers must remain permeable to water while under compression, and the carrier layer should be capable of storing water when compressed. Such felts can be made of wool, plastic, plastic fiber, or a blend of such materials.

In felts currently most frequently used, the carrier layer or base includes one or several layers of plastic fabric. To the top side of the base, one or several layers of random fiber bat layers are needled. During the needling operation, a mechanical bond is formed between bat and base by sharp-edged needles which have tooth-like notches in their edges that pull fibers from the bat and plug them vertically into or through the base or carrier layer. After the needles are retracted, the fibers remain stuck in the base by friction forces.

These types of felts are suited for a wide range of applications, but in some applications bottlenecks in dewatering become apparent. In particular, the extraction of water by air purging by use of suction boxes and suction rolls becomes increasingly ineffectual with rising machine running speed because the duration of the suction pulse diminishes.

In order to compensate for this shortcoming, the bat layers of the felts are designed more open and coarser. As a consequence, the uniformity of paper support is reduced. Also, in wet presses of paper machines, "felt marking" of the paper surface by the felt surface occurs, which is detrimental to paper quality. Further, the dryness of the paper after wet pressing is reduced by increasing backflow of water from the felt to the paper on the outgoing end of the pressing zone.

Furthermore, the bat fibers plugged into the interstices of the base layer retain water similarly to paint brushes by use of their large free surface area. Between these bat fibers, dirt particles and other matter can get stuck, reducing the water storage capacity of the interstices in the base layer still further.

The net water storage capacity of the felt, defined as the maximum water content minus the remaining water content after a water removing step, is to a great deal influenced by the number and length of the fibers plugged into the interstices of the base. Such fibers determine the strength of the bond between bat and base.

The negative effect of bat fibers within the interstices or cavities of the base was recognized a long time ago, and as an attempted solution to this deficiency, a product is described by Edward Race in APR (Aligemeine Papier-Rundschau) No. 37/38, 1970, pages 1378 to 1388. This product is intended to overcome the mentioned deficiencies. In particular, see page 1386, middle column, last paragraph; page 1388, first column; and FIG. 6.

Despite a special needling technique, the storage capacity of this product is small in comparison with the thickness of the base, and the felt is required to be sufficiently coarse in order to be dewatered by air purging over suction box slots. This felt design, however, as a consequence of manufacturing problems, did not prevail. This felt design was succeeded by open felt structures with coarse bat layers attached to both sides of a stiff base layer fabric.

SUMMARY OF THE INVENTION

The present invention improves upon a felt as described above in a way that increases its net water storage capacity, facilitates water release in a downward direction, or to the inside of the felt loop, and improves the uniformity of paper support by the bat. In particular, the downward water release is improved to an extent that an air purging device through the felt is rendered unnecessary in order to obtain sufficient drainage.

In addition, the paper-supporting bat is made small-pored and dense to the extent that a rewetting of the paper by the felt on the outgoing end of the pressing zone is avoided or greatly reduced. The density of the bat is so high that drainage by air purging does not occur, even at higher pressure differences through the felt.

The free surface area of the fibers introduced by needling into the interstices and cavities of the base is reduced in a following treatment step. This reduction not only improves the water release from the interstices or cavities of the base but also improves the bonding strength between bat and base. In this way, it becomes possible to achieve sufficient bonding strength with fewer bat fibers plugged into the base, thus increasing the water storage capacity of the base. This effect is accomplished by gluing the bat fibers protruding into the interstices of the base to each other or to the walls of the base material.

According to another embodiment of the invention, the bat fibers protruding into the interstices or cavities of the base are shrunk in length, starting from their lower ends. Along with a thickening of the fiber ends, the specific surface, or surface area per unit volume, of the fibers is reduced in this way. The thicker ends of the fibers, like rivet heads, increase the separation resistance between bat and base.

The improvement of water storage in, and water release from, the interstices of the base as described above renders unnecessary the air purging action as a method of felt dewatering, and the fibers of the bat can be made finer and packed denser than before. The cross-sectional area of the fibers may be reduced to a range from 0.00002 to 0.0003 $mm^2$. With these fine fibers, the support of the paper web is improved to an extent that the paper surface is no longer marked by local intrusions into the felt during pressing. The bat, of course, can include fiber layers of different degrees of coarseness.

Structure and thickness of the bat depend predominantly upon the uniformity of support provided by the base. The thinner the bat is, the lower will be its flow resistance. The thicker the bat, the greater is its capability to equalize nonuniformities of the base structure. If the topography of the base surface is very fine, about 200 $g/m^2$ of bat fiber will be sufficient. If it is coarser, more mass in the bat will be required to establish uniform paper support.

If a loose bat layer is placed on the base, too many stitches are necessary to compact the fibers of the bat sufficiently, and in consequence, too many bat fibers are unnecessarily plugged into the interstices of the base. In order to avoid this undesired overplugging, at least part of the bat layers are pre-compacted before they are needled to the base.

A precompacted intermediary layer can be provided between the base and top bat layer. This intermediary layer may be formed of a material of inferior strength. The higher strength fibers needled through it provide good bonding strength to the base. In the same manner, a foil or membrane can be needled into the felt sandwich.

An originally watertight foil can be rendered pervious by the needling stitches. The carrier layer or base can also be formed of a perforated foil which, for example, contains cavities with openings to the bottom side.

As reinforcement, the carrier layer may contain reinforcement threads extending in machine direction as well as in cross machine direction. These threads improve the tear resistance of the foil.

In order to facilitate handling during installation and removal of felts in the machine, the mass per unit area of the base must not be higher than what is necessary to satisfy the demands on strength and water storage capacity of the specific application. On the other hand, there are applications wherein sufficiently large cavities or interstices are required in order to accommodate a large quantity of water to be drained from the paper in a pressing step. The mass per unit area of the base can be from 500 to 2000 g/m$^2$.

Although compaction of felts by post-needling treatment is known, e.g., by heat application and mechanical compression, the desired effect of increasing the net storage capacity of the felt is not obtained by these general methods. On the contrary, these methods tend to reduce the cavity volume and thus the water storage capacity. Therefore, it is a special feature of the invention to reshape the fibers in the base specifically by selective treatment from the bottom side of the felt in such a way that their specific surface area in the interstices or cavities will be decreased.

One method to this end provides for flowing or spraying of a treatment fluid, such as formic acid, into the cavities. As a response to the softening effect, the pre-stressed fiber can shrink in length and simultaneously develop a tacky surface that may bond or glue to the internal surfaces of the base or of other bat fibers in the cavities.

Another method of shrinking the length of the fibers and thickening the fiber ends in the cavities includes thermal softening or even melting of the fiber ends.

One provision to achieve this result includes moving the underside of the felt slowly over hot air nozzles that blow hot air into the cavities and effect the thermal reshaping of the fiber ends.

In another embodiment, the heating of the fiber ends is accomplished by electromagnetic radiation in a suitable wave length range somewhere between ultraviolet and radio waves.

During thermal reshaping, the fiber ends are intensely heated, whereas the base is not excessively affected by the heat application. One method to obtain this result includes making the fibers of an opaque material or selecting the wavelength of the electromagnetic waves to fit within a range of high energy absorption of the bat fiber material.

On the other hand, it may also be advantageous to render the exposed surfaces of the base layer less susceptible to heat absorption by using reflective surfaces, a transparent body, or an insulating coating. The material of the base layer may also have a higher softening or melting point than that of the bat fibers.

In still another embodiment of the production method, the decrease of the free surface area of the bat fibers needled into the cavities of the base is effected in three steps. These three steps protect the base layer or base fabric as much as possible from undesired thermal effects and reduce the bat fiber surface area in the cavities of the base as much as possible. In the first step, fibers protruding from the bottom side of the base are cut or flamed off. In the second step, the most exposed parts of the base, e.g., the bottom knuckles of the base fabric threads, are coated with a protective layer. In the third step, heat is conducted or convected into the cavities of the base. Regardless of whether hot air or radiation heat is applied, the protective coat effects a reduction of temperature at the most exposed parts of the base layer.

The protective coating layer has reflecting and/or insulating qualities. It is sufficiently heat-resistant to outlast the short duration of the heating pulse. It is also easily removable, like loose chalk, or soluble.

The thermal effect, particularly in the case of electromagnetic radiation, can be increased by adding directional components other than perpendicular to the felt plane. These inclined components ensure in a woven base that cavities at a larger depth from the bottom surface are reached. These cavities would be shielded by nearby threads during purely perpendicular irradiation. This three dimensional radiation can be effected, for example, by a laser combined with a lens of short focal length that concentrates the parallel laser light to a small spot within the base layer. Of course, other radiation sources and their combinations with reflectors or lenses are also possible.

With sufficiently high energy density, parts of the fibers in the cavities can be burned or evaporated, thereby enlarging the free storage capacity in the cavities as desired.

With hot air application, the range of depth of the thermal effect into the base layer can be extended by sucking air through the top surface of the felt in the area of hot air application from the bottom side. The air blown into the cavities also cools in the cavities via heat transmission to the fibers. This cooled air should not escape from the cavities in a direction counter to the direction of the hot air stream in order to avoid cooling off the hot air stream by intermixing. By sucking the cooled air through the bat to the top side, this cooling by intermixing is avoided or greatly reduced.

In order to obtain a good bond between the base layer and the bat layer, even with greatly reduced length and number of fibers in the cavities of the base, the uppermost weft threads of the base layer are formed of spun yarns. The other threads of warp or weft of the three-layer or four-layer base fabric (three to four layers of weft threads) are formed of monofilaments strands or of strands of two to eight monofilaments twisted together. Strands formed of a single monofilament have the advantage of stiffness and hence a larger storage capacity for water in the base fabric under compression in the pressing zone. Strands formed of several monofilaments twisted together are more pliable and therefore better suited as a base for needling.

In many grades of printing paper, different degrees of smoothness of the two paper surfaces is undesired. By pressing a paper web in a double-felted pressing zone, with one felt being of the new design with a fine and smooth bat and the other felt being of conventional coarse and open design, e.g., to render it sufficiently porous to function in a vacuum transfer position, the two paper surfaces are given different degrees of smoothness after pressing.

In order to avoid this two-sidedness and also to suppress rewetting of the paper from the felt, another feature of the invention provides for a very thin top layer of bat, including coarse fibers, being placed upon the main body of finer bat fibers before needling. The coarse (thicker) fibers of this thin top layer imparts an embossing effect to the paper surface that is comparable to that created on the other surface by the conventional felt. Because of the fine fibers immediately supporting the thin layer of coarse fibers, rewetting of the paper by the felt at or following the pressing zone exit is avoided. However, the layer of coarse fibers must be very thin, in the range of 20 to 100 g/m$^2$, in order to escape rewetting.

Because during needling the uppermost layers of thicker fibers will be gripped by the notches of the needles and will be drawn into the base layer, the necessary bonding strength between base layer and bat can be achieved with fewer fibers and smaller free fiber surfaces in the cavities of the base layer if the fiber diameter (d) is larger. This is because bond strength depends on both the cross section of the fibers connecting the base and the bat and on the surface area on the circumference (cross section increases with d$^2$ and surface area increases only proportional to d).

A very general feature of the invention provides for actions that will counteract or diminish the restriction and blockage of interstices or cavities in the base layer that result from the needling process.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 is a side, sectional view of a manufacturing steps in felt production;

FIG. 7 is a side, sectional view electromagnetic radiation felt treatment;

FIG. 8 is a side, sectional view of a further embodiment of a multi-layer felt; and FIG. 9 is a side, sectional view of a still further embodiment of felt with insulating coating on the bottom side.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
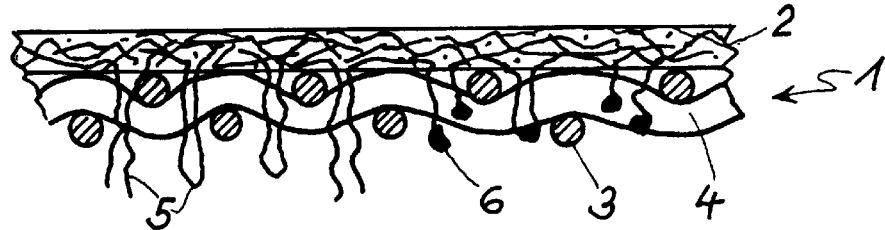
FIG. 1 is a side, sectional view of one embodiment of a felt according to the invention.

Referring now to the drawings and particularly to FIG. 1, there is shown a bat layer 2 supported by a substantially permeable base layer 1. The base layer 1 is a woven fabric belt composed of longitudinal threads 3 and cross direction threads 4. In the left-hand half of FIG. 1, some polyamide fibers 5 from the bat 2 are needled all the way through the base 1. In the right-hand half of the figure, these fibers are deformed or reshaped by shrinking in their length direction and thickening of their ends 6. Due to the deformation, the specific surface of ends 6 is substantially less than that of fibers 5.

Figure 2:
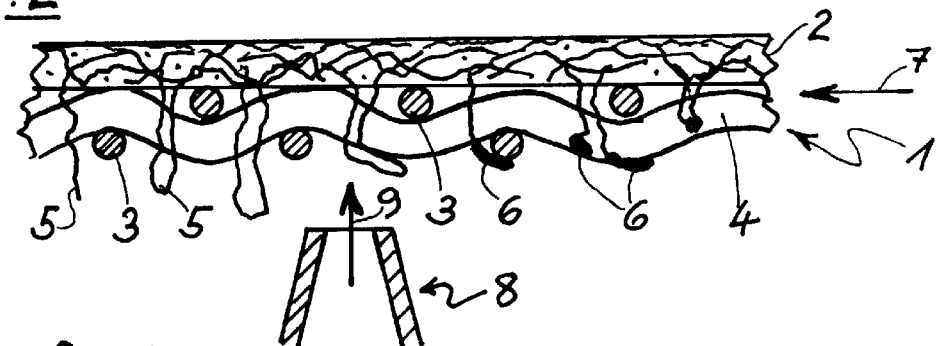
FIG. 2 is a side, sectional view of the felt of FIG. 1 during treatment.

In FIG. 2, a cross section of a felt with a base layer 1 and a bat layer 2 is again shown. The felt is moved in the direction of arrow 7 over a treatment nozzle 8. A treatment fluid 9 is transported through its bottom face into the base layer 1. In the left-hand half of FIG. 2, still-untreated fiber ends or fiber end loops 5 can be seen. In the right-hand half of FIG. 2, the fiber ends and end loops 6 are shrunk and thickened in response to softening by the treatment fluid 9 and are bonded to the base layer threads 3 and 4. The fiber end loop 10 is just beginning to soften and shrink.

Figure 3:
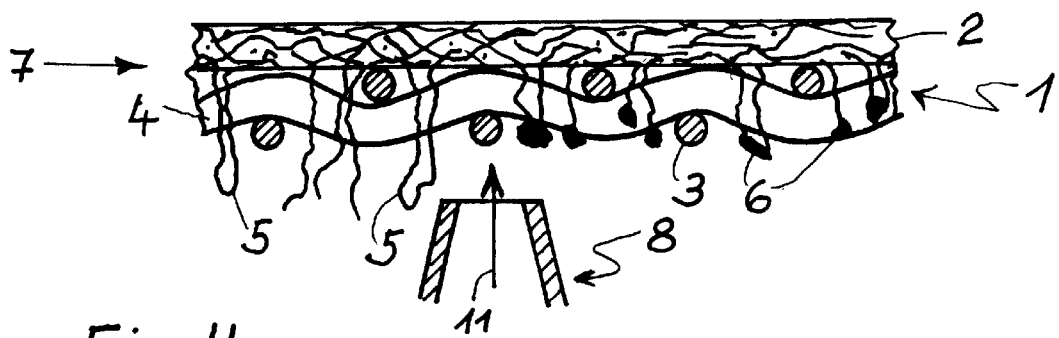
FIG. 3 is a side, sectional view of the felt of FIG. 1 being thermally treated.

In FIG. 3 there is again a cross-sectional element of felt shown with a base layer 1 and a bat layer 2. The element is being moved in the direction of arrow 7 past a treatment nozzle 8. The untreated fibers 5 in the left-hand half melt in the stream of hot air 11 issuing from the nozzle 8 and form thickened ends 6. Base 1 can be formed of a material having a heat resistance greater than that of the material of bat 2.

Figure 4:
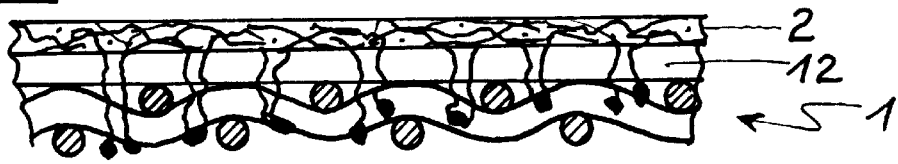
FIG. 4 is a side, sectional view of another embodiment of a felt with an intermediary layer of bat.

FIG. 4 shows a different felt construction containing an intermediary layer 12 between base layer 1 and top bat layer 2. This intermediary layer 12 can be made of fibers or of foil. Although only three layers are shown in FIG. 4, there may be more layers contained in the felt structure for special requirements. For instance, the base 1 may be composed of two layers and the bat 2 of three or four layers that are made from finest fibers in the top layer and become coarser in the downward direction.

Figure 5:
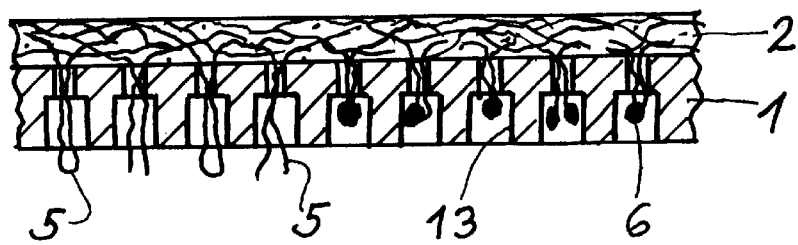
FIG. 5 is a side, sectional view of yet another embodiment of a felt with a single piece base layer.

FIG. 5 shows a felt that includes a base layer 1 that contains cavities 13 machined into its bottom part and into which bat fibers 5 are plugged (left-hand half). Bat fibers 5 are shortened and thickened (6) by post-needling treatment (right-hand half).

FIG. 6 shows basic steps of production of the felt structure. Proceeding from left to right, bat fibers 5 are moved downward into the base layer 1 by needles 14 containing notches 15 at their edges that grip the fibers 5 during their downward movement. In an additional treatment step, the fiber ends 5 are transformed into the shape 6 at right.

FIG. 7 shows still another cross section of a felt 20 composed of base layer 1 and bat layer 2. The threads 3 and 4 of the base layer 1 are shielded by a protecting layer 16 from the heat supplied by electromagnetic radiation 17 and 22, which respectively issue from a lense 18 and a mirror 21 illuminated by a light source 19. Mirror 21 or lense 18 focus the electro-magnetic radiation into the inside of the cavities of the base layer 1, thus increasing the local temperature sufficiently to melt fiber ends 5 into clumps 6 during the movement of the felt 20 in the direction of arrow 7 past the radiators 18 and 21.

Modified as described, the paper machine felt is capable of easily storing and later discharging water from the cavities or interstices of the base layer, by air displacement or centrifugal forces, through the bottom or inside surface of the felt loop.

In FIG. 8, 31 is a cross-sectional element of a felt with a 3-layered base fabric 32 to which a bat 33 is needled. The base fabric 32, serving as carrier layer, is composed of an upper row of weft threads 34 made of yarns spun from thin fibers, a middle row of weft threads 35, each twisted from five monofilaments 36, and a bottom row of weft threads 37 in the shape of single-strand stiff monofilaments.

The weft threads 34, 35 and 37 are kept together by monofilament warp threads 38, 38', 38", 38''' and 38"", and form together with them the carrier layer 32. The order of the warp threads along different paths in the base fabric repeats itself in a recurring pattern across the full area of the felt. As the warp threads 38, 38' and 38" connect only the two upper rows of weft threads, the remaining warp threads 38''' and 38"" interweave the bottom row of weft threads 37 with the remaining structure of the carrier layer 32. Thus, base 32 includes a top mesh layer that is finer and less open than a bottom mesh layer.

The bat layer 33 is composed of substantially randomly distributed fibers 39 oriented in the plane of the felt. Individual strands 40 of fibers 39 are drawn into and partly through the base layer 32 by the needling action. The ends 40' of the fibers 40 are either free ends 41 or end loops 42. The part of the fibers 40' shown in dotted lines may be burned, evaporated or contracted to a thickened section or a bead 43 during the following reshaping operation so that only the sections of fiber strands 40 which are shown in full line remain.

If the shortening of fibers 40' as shown in the dotted sections is done by radiation energy, a substantial portion of this radiation energy can be applied in an inclined direction as indicated by arrows 44 and 45, rather than in a vertical direction, e.g., between 50° and 70° relative to the felt plane. In this way, even more remote cavities in the higher parts of the base layer 32 will be reached by radiation.

In FIG. 9, a cross-sectional element 51 of a felt is shown, composed of a woven carrier layer 52 and a bat layer 53 resting on top of it. The carrier layer 52 is composed of threads 54 and 55 extending in a direction substantially perpendicular to the plane of the figure, and threads 56 extending in a direction substantially parallel to the plane of the figure. The bat 53 is composed of fibers 59 predominantly extending substantially parallel to the plane of the felt 51. Parts of these fibers 59 are deviated into and through the base 52 in strands 60 by the needling action. The strands 60 are composed of individual fibers 60' with ends 61.

During post-treatment, following the needling operation, the lower parts of the fibers 60' are shortened to a position close to the bottom surface of the base layer 52, as indicated by beads 62. In other words, during this first step of post-treatment, the sections of the threads between the original ends 61 and the beads 62 will be removed. In a second step, a protective coating layer 57 is applied to the bottom knuckles of threads 55, and protective coating 58 is applied to the bottom knuckles of threads 56. These coating layers 57 and 58 serve as heat protection during the third step of the treatment, during which heat is applied in concentrated form into the cavities of the base layer 52 in order to shrink the length of fibers 60' further up to the beads 63.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of producing a paper-making machine felt, comprising the steps of:

providing a base including a plurality of cavities;

providing a bat with a plurality of substantially thin fibers on a paper side, said fibers having a plurality of ends and a plurality of end loops each of said ends and said end loops including a free surface area;

needling said fibers to said base;

plugging at least one of said bat fiber ends and said bat fiber end loops into said cavities of said base; and reducing said free surface areas of at least one of said bat fiber ends and said bat fiber end loops within said cavities by selectively acting from a bottom side of said base to reshape at least one of said bat fiber ends and said bat fiber end loops, said reducing step sequentially following said needling step, said reducing step reshaping said bat fiber ends, said reducing step including the sequential steps of:

one of cutting and burning off said bat fiber ends protruding from said bottom side of said base;

coating said bottom side of said base with a protective layer; and thermally reducing at least one fiber length within said cavities of said base by applying energy from said bottom side of said base, thereby thermally reshaping at least one fiber.

2. A method of producing a paper-making machine felt, comprising the steps of:

providing a base including a plurality of cavities;

providing a bat with a plurality of substantially thin fibers on a paper side, said fibers having a plurality of ends and a plurality of end loops, each of said ends and said end loops including a free surface area;

needling said fibers to said base;

plugging at least one of said bat fiber ends and said bat fiber end loops into said cavities of said base; and reducing said free surface areas of at least one of said bat fiber ends and said bat fiber end loops within said cavities by selectively acting from a bottom side of said base to reshape at least one of said bat fiber ends and said bat fiber end loops, said reducing step sequentially following said needling step, said reshaping being performed thermally, said thermal reshaping including applying a thermal treatment at an intensity level at which said fibers extending into said cavities of said base are one of partly burned and partly evaporated.

3. A method of producing a paper-making machine felt, comprising the steps of:

providing a base including a plurality of cavities;

providing a bat with a plurality of substantially thin fibers on a paper side, said fibers having a plurality of ends and a plurality of end loops, each of said ends and said end loops including a free surface area;

needling said fibers to said base;

plugging at least one of said bat fiber ends and said bat fiber end loops into said cavities of said base; and reducing said free surface areas of at least one of said bat fiber ends and said bat fiber end loops within said cavities by selectively acting from a bottom side of said base to reshape at least one of said bat fiber ends and said bat fiber end loops, said reducing step sequentially following said needling step, said reshaping being performed chemically.

4. The method of claim 3, wherein said fibers of said bat are comprised of polyamide, said reshaping being performed with one of gaseous formic acid and dissolved formic acid.

5. A method of producing a paper-making machine felt, comprising the steps of:

provoking a base including a plurality of cavities;

providing a bat with a plurality of substantially thin fibers on a paper side, said fibers having a plurality of ends and a pluralist of end loops, each of said ends and said end loops including a free surface area;

needling said fibers to said base;

plugging at least one of said bat fiber ends and said bat fiber end loops into said cavities of said base; and reducing said free surface areas of at least one of said bat fiber ends and said bat fiber end loops within said cavities by selectively acting from a bottom side of said base to reshape at least one of said bat fiber ends and said bat fiber end loops, said reducing step sequentially following said needling step, said reducing step including shrinking a length of one of said bat fiber ends and said bat fiber end loops.

6. The method of claim 5, wherein said shrinking of said bat fiber ends and thickening of said bat fiber ends is effected by a heating pulse of substantially short duration.

7. The method of claim 6, wherein said heating pulse is effected by a stream of substantially hot air.

8. The method of claim 7, comprising the further step of sucking air through a top side of an area of the felt whereat said stream of substantially hot air is applied to said bottom side of said base of the felt.

9. The method of claim 6, wherein said heating pulse is effected by electromagnetic waves.

10. The method of claim 9, wherein said bat fibers are substantially absorbent to a wavelength range of said electromagnetic waves.

11. The method of claim 10, wherein said base includes a plurality of surfaces, said surfaces being substantially unabsorbent to heat.

12. The method of claim 11, wherein said base comprises a first material having a first heat resistance, said bat fibers comprising a second material having a second heat resistance, said first heat resistance being greater than said second heat resistance.

13. The method of claim 12, wherein said heating pulse is transmitted multidirectionally from below said base, said heating pulse having an average angle of inclination relative to a plane of said felt of approximately between 50° and 70°.

14. A machine felt for transporting and/or dewatering a fiber material web comprising:

a substantially permeable base having a top side, a bottom side, a plurality of cavities opening into the bottom side and a hole passing from the top side to one of said plurality of cavities;

a bat having at least one layer disposed adjacent the top side of the base; and at least one bat fiber disposed within the at least one layer and passing from the top side of the base through the hole and into one of the plurality of cavities, the at least one fiber having a first surface area per unit volume sized to fit within the hole and a second surface area per unit volume, the second surface area per unit volume being substantially smaller than the first surface area per unit volume, the second surface area per unit volume being located within the at least one cavity and sized such that the second surface area per unit volume of the at least one bat fiber may not pass through the hole, so as to provide increased bonding strength between the base and said at least one bat layer and to facilitate water release from the at least one cavity of said base, the bat fiber second surface area per unit volume being shrunken in length and thickened in cross-section.

* * * * *